US012060540B2

(12) United States Patent
Naganuma et al.

(10) Patent No.: US 12,060,540 B2
(45) Date of Patent: Aug. 13, 2024

(54) DETERGENT COMPOSITION FOR METAL PRODUCT AND METHOD FOR CLEANING METAL PRODUCT USING SAID DETERGENT COMPOSITION

(71) Applicants: KAO CORPORATION, Tokyo (JP); AISIN CORPORATION, Kariya (JP)

(72) Inventors: Jun Naganuma, Sakai (JP); Takayuki Hisano, Kariya (JP); Takao Kobayashi, Kariya (JP)

(73) Assignees: KAO CORPORATION, Tokyo (JP); AISIN CORPORATION, Kariya (JP)

(*) Notice: Subject to any disclaimer, the term of this patent is extended or adjusted under 35 U.S.C. 154(b) by 51 days.

(21) Appl. No.: 17/425,456

(22) PCT Filed: Jan. 23, 2020

(86) PCT No.: PCT/JP2020/002317
§ 371 (c)(1),
(2) Date: Jul. 23, 2021

(87) PCT Pub. No.: WO2020/153424
PCT Pub. Date: Jul. 30, 2020

(65) Prior Publication Data

US 2022/0098519 A1 Mar. 31, 2022

(30) Foreign Application Priority Data

Jan. 25, 2019 (JP) ................................ 2019-011517

(51) Int. Cl.
*C11D 1/72* (2006.01)
*C11D 1/722* (2006.01)
(Continued)

(52) U.S. Cl.
CPC .................. *C11D 3/30* (2013.01); *C11D 1/72* (2013.01); *C11D 1/722* (2013.01); *C11D 3/0026* (2013.01);
(Continued)

(58) Field of Classification Search
CPC ......... C11D 1/72; C11D 1/722; C11D 3/2075; C11D 3/2079; C11D 3/2082; C11D 3/30
(Continued)

(56) References Cited

U.S. PATENT DOCUMENTS 5,354,856 A 10/1994 Kawashima et al.
9,670,433 B1 * 6/2017 Hodge ..................... C11D 3/43
(Continued)

FOREIGN PATENT DOCUMENTS

CN 102770522 A 11/2012
EP 3118295 A1 * 1/2017 ............. B08B 1/006
(Continued)

OTHER PUBLICATIONS

International Search Report (PCT/ISA/210) issued in PCT/JP2020/002317 mailed on Apr. 7, 2020.
English translation of International Preliminary Report on Patentability and Written Opinion of the International Searching Authority for International Application No. PCT/JP2020/002317, dated Aug. 5, 2021.
(Continued)

*Primary Examiner* — Gregory R Delcotto
(74) *Attorney, Agent, or Firm* — Birch, Stewart, Kolasch & Birch, LLP

(57) ABSTRACT

A detergent composition for metal product, which contains an amine (component A) represented by a general formula (I), a salt (component B') of a dicarboxylic acid (component B) represented by a general formula (II): HOOC—$R^4$—COOH (II) and the amine (component A), a salt (component C') of a monocarboxylic acid (component C) represented by a general formula (III): $R^5$—COOH (III) and the amine (component A), a nonionic surfactant (component D) represented by a general formula (IV): $R^6$—O-{(EO)n/(PO)
(Continued)

m}-H (IV), and water (component E) and has a pH of more than 7 and 10 or less. The detergent composition for metal product exhibits excellent detergency and metal corrosion suppressing performance.

16 Claims, 1 Drawing Sheet

(51) Int. Cl.

| | |
|---|---|
| ***C11D 3/00*** | (2006.01) |
| ***C11D 3/20*** | (2006.01) |
| ***C11D 3/30*** | (2006.01) |
| ***C11D 17/00*** | (2006.01) |

(52) U.S. Cl.
CPC .......... *C11D 3/2075* (2013.01); *C11D 3/2079* (2013.01); *C11D 3/2082* (2013.01); *C11D 17/0008* (2013.01); *C11D 2111/16* (2024.01); *C11D 2111/20* (2024.01)

(58) Field of Classification Search
USPC ........ 510/245, 255, 264, 421, 477, 488, 499
See application file for complete search history.

(56) References Cited

U.S. PATENT DOCUMENTS

| | | | | |
|---|---|---|---|---|
| 10,392,587 | B2 * | 8/2019 | Man | C11D 1/66 |
| 2012/0204908 | A1 * | 8/2012 | Byrne | C11D 3/2089 134/29 |
| 2012/0316097 | A1 | 12/2012 | Maeyama et al. | |

FOREIGN PATENT DOCUMENTS

| | | | | |
|---|---|---|---|---|
| JP | 4-270800 | A | 9/1992 | |
| JP | 6-306662 | A | 11/1994 | |
| JP | 7-268674 | A | 10/1995 | |
| JP | 8-34991 | A | 2/1996 | |
| JP | 2008-133363 | A | 6/2008 | |
| JP | 2010-77342 | A | 4/2010 | |
| JP | 2013-91752 | A | 5/2013 | |
| JP | 2013-213266 | A | 10/2013 | |
| JP | 2016-17081 | A | 2/2016 | |
| WO | WO-2007099294 | A1 * | 9/2007 | C11D 1/75 |
| WO | WO-2008155518 | A1 * | 12/2008 | C11D 1/75 |
| WO | WO 2011/105449 | A1 | 9/2011 | |

OTHER PUBLICATIONS

English translation of Chinese Search Report for Chinese Application No. 202080010544.X, dated Oct. 19, 2022.

* cited by examiner

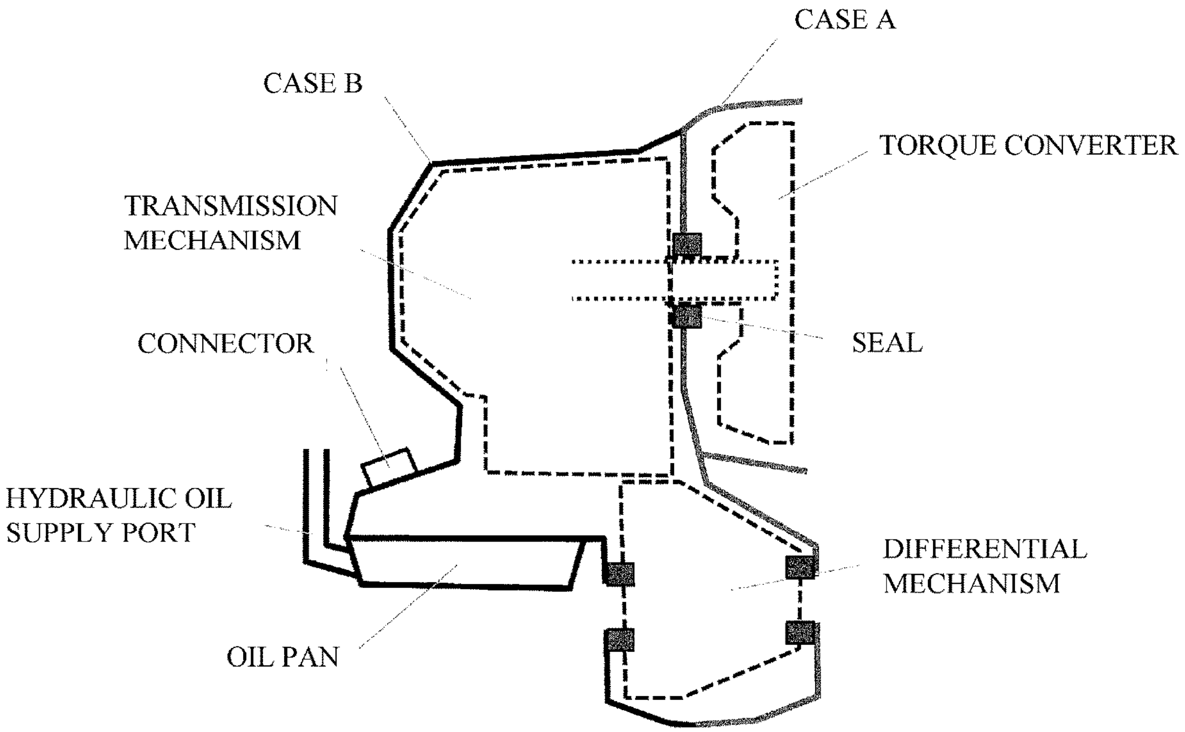
CASE A
CASE B
TORQUE CONVERTER
TRANSMISSION MECHANISM
CONNECTOR
SEAL
HYDRAULIC OIL SUPPLY PORT
DIFFERENTIAL MECHANISM
OIL PAN

DETERGENT COMPOSITION FOR METAL PRODUCT AND METHOD FOR CLEANING METAL PRODUCT USING SAID DETERGENT COMPOSITION

TECHNICAL FIELD

The present invention relates to a detergent composition for metal product and a method for cleaning a metal product using the detergent composition.

BACKGROUND ART

Metals including iron, copper, and aluminum are processed and used in industrial products in various fields. Various detergents are used for the purpose of removing stains adhering to the surface of such metal products during processing and at the time of finishing. The function required of detergents is to purify the surface of metals. However, metals are oxidized by oxygen in the air, easily corrode, and thus are generally subjected to anticorrosive treatment such as application of anticorrosive agent after being cleaned. It is required to remove the unnecessary anticorrosive agent from the metal surface and to purify the metal surface again immediately before the work in the next process, and this increases the number of work processes. In such a case, the work efficiency can be improved by using a detergent having anticorrosive performance in addition to high cleaning performance as a detergent. In some metal products, different kinds of metals such as iron and aluminum are used at a plurality of spots, and the detergent is required to contain effective anticorrosive agents for the respective metals of such metal products.

Various detergents have thus been developed. For example, Patent Document 1 describes a detergent composition which has a high cleaning effect, can impart rust prevention property to iron-based metal parts, does not corrode non-ferrous metal parts, contains a specific nonionic surfactant, an aliphatic carboxylic acid, and an aromatic carboxylic acid, and has a pH in a range of 5 to 10 adjusted with an organic alkali.

Patent Document 2 describes a detergent composition for metal product, which exhibits high rust prevention property, wastewater treatment (biological treatment) property, high detergency (degreasing power), and contains amine soap of vegetable fatty acid including at least either of oleic acid or linoleic acid, a polyoxyethylene-based nonionic surfactant, a glycol ether-based water-soluble organic solvent, a sequestrant, a dibasic fatty acid amine soap, and water.

Patent Document 3 describes an amine-free non-rinse type water-soluble detergent composition, which contains (1) a sulfur-containing compound, (2) an organic acid, (3) an inorganic salt, (4) an inorganic alkali, and (5) water.

Patent Document 4 describes a water-soluble detergent composition of which the detergent components can be quickly removed at the time of rinsing and which contains (A) 1-hydroxyethylidene-1,1-diphosphonic acid, (B) a nonionic surfactant represented by a formula: R—$(PO)_n$-$(EO)_m$—OH, (C) a nonionic surfactant represented by a formula: R-$(EO)_1$—OH, and (D) an organic acid.

Patent Document 5 describes a detergent composition which has low foaming performance and rust preventive function in cleaning of metals and contains a polyoxyalkylene adduct of 1,3-di-alkyloxy-2-propanol and polyoxyethylene polyoxypropylene alkyl ether.

Patent Document 6 describes a water-soluble cleaning and rust preventing agent composition which exhibits excellent detergency and rust prevention property, is easily handled, and contains (a) at least either of a monocarboxylic acid having 4 to 12 carbon atoms or a dicarboxylic acid having 4 to 12 carbon atoms at 5 to 20 parts by weight, (b) alkanolamine at 15 to 30 parts by weight, (c) a diamine represented by $R(H)N(CH_2)_nNH_2$ at 0.5 to 10 parts by weight, and water based on 100 parts by weight of the entire amount of the water-soluble cleaning and rust preventing agent composition.

Patent Document 7 describes a water-soluble detergent for automatic transmission, which contains a purifying agent, a cleaning auxiliary agent, and a rust preventive agent as additives among the components constituting the detergent and in which the respective additives contain a surfactant that is soluble in hydraulic oil for automatic transmission, a sequestrant, and an organic amine-based anticorrosive agent.

PRIOR ART DOCUMENTS

Patent Document

Patent Document 1: JP-A-2013-213266
Patent Document 2: JP-A-7-268674
Patent Document 3: JP-A-2008-133363
Patent Document 4: JP-A-2010-77342
Patent Document 5: JP-A-2013-91752
Patent Document 6: JP-A-6-306662
Patent Document 7: JP-A-4-270800

SUMMARY OF THE INVENTION

Problems to be Solved by the Invention

However, the detergent compositions and cleaning methods described in Patent Documents 1 to 7 have problems that both the cleaning performance and metal corrosion suppressing performance are not satisfied in cleaning of metal products and the metal surface corrosion suppressing effect at the time of long-term storage in a hot and humid environment is insufficient.

The present invention has been made in view of the above circumstances, and can provide a detergent composition for metal product, which exhibits excellent detergency and metal corrosion suppressing performance, and a method for cleaning a metal product using the detergent composition.

Means for Solving the Problems

The present invention relates to a detergent composition for metal product, which contains an amine (component A) represented by a general formula (I):

[Formula 1]

(I)

(in the general formula (I), $R^1$ and $R^2$ are each independently a hydrogen atom, an alkyl group having 1 or more and 6 or less carbon atoms, a phenyl group, a benzyl group, an aminoethyl group, a hydroxyethyl group, or a hydroxypropyl group and $R^3$ is a hydroxyethyl group or a hydroxypropyl group);

a salt (component B') of a dicarboxylic acid (component B) represented by a general formula (II): HOOC—$R^4$—COOH (II)

(in the general formula (II), $R^4$ is an alkylene group having 10 or more and 12 or less carbon atoms) and the amine (component A);

a salt (component C') of a monocarboxylic acid (component C) represented by a general formula (III): $R^5$—COOH (III)

(in the general formula (III), $R^5$ is a linear or branched alkyl group or alkenyl group having 11 or more and 21 or less carbon atoms) and the amine (component A);

a nonionic surfactant (component D) represented by a general formula (IV): $R^6$—O-{(EO)n/(PO)m}-H (IV)

(in the general formula (IV), $R^6$ is a secondary alkyl group having 8 or more and 18 or less carbon atoms, EO is an ethyleneoxy group, PO is a propyleneoxy group, n is an average number of moles of EO added, m is an average number of moles of PO added, n is a number 2 or more and 20 or less, m is a number 0 or more and 20 or less, and forms of PO and EO added in curly brackets may be either random arrangement or block arrangement); and water (component E), and has a pH of more than 7 and 10 or less.

The present invention further relates to a method for cleaning a metal product, which includes a step of cleaning a metal product using the detergent composition for metal product described above.

Effect of the Invention

The details of the action mechanism of the effect in the detergent composition for metal product of the present embodiment are presumed as follows although part of the details is unclear. However, the present invention does not have to be construed as being limited to this action mechanism.

The detergent composition for metal product of the present invention contains an amine (component A) represented by the general formula (I), a salt (component B') of a dicarboxylic acid (component B) represented by the general formula (II) and the amine (component A), a salt (component C') of a monocarboxylic acid (component C) represented by the general formula (III) and the amine (component A), a nonionic surfactant (component D) represented by the general formula (IV), and water (component E) and has a pH of more than 7 and 10 or less. Usually, the detergent composition for metal product is prepared by blending the amine (component A) represented by the general formula (I), the dicarboxylic acid (component B) represented by the general formula (II), the monocarboxylic acid (component C) represented by the general formula (III), the nonionic surfactant (component D) represented by the general formula (IV), and water (component E). Hence, the blended dicarboxylic acid (component B) and amine (component A) form a salt in water, and thus the detergent composition for metal product of the present invention substantially contains a salt (component B') of the dicarboxylic acid (component B) and the amine (component A). The monocarboxylic acid (component C) and amine (component A) also form a salt in water, and thus the detergent composition for metal product of the present invention substantially contains a salt (component C') of the monocarboxylic acid (component C) and the amine (component A).

It is presumed that the detergent composition for metal product of the present invention acts on the stains adhering to the metal surface, particularly organic stains and decreases the surface tension by the presence of the amine (component A), the nonionic surfactant (component D), and the water (component E) and the stains can be taken and removed from the metal surface into the detergent composition. It is presumed that the salt (component B') of the dicarboxylic acid (component B) and the amine (component A) and the salt (component C') of the monocarboxylic acid (component C) and the amine (component A) act on iron and the salt (component C') of the monocarboxylic acid (component C) and the amine (component A) acts on non-ferrous metals such as aluminum and copper and suppresses corrosion. It is presumed that the detergent composition permeates into the narrow gaps and internal corners of the metal product by the action of the nonionic surfactant (component D), the detergent composition and the object to be cleaned are efficiently brought into contact with each other, and the cleaning effect and the corrosion suppressing effect are both enhanced. It is presumed that the detergent composition is weakly alkaline and the metal surface is passivated while promoting the saponification of fats and oils by setting the pH of the detergent composition to more than 7 and 10 or less in the presence of the amine (component A) and thus the detergency and corrosion suppression can be both achieved.

BRIEF DESCRIPTION OF THE DRAWINGS

FIG. 1 is a schematic view illustrating a form of an automatic transmission for motor vehicle used in Examples.

MODE FOR CARRYING OUT THE INVENTION

<Detergent Composition for Metal Product>

The detergent composition for metal product of the present invention contains an amine (component A) represented by a general formula (I):

[Formula 2]

(I)

(in the general formula (I), $R^1$ and $R^2$ are each independently a hydrogen atom, an alkyl group having 1 or more and 6 or less carbon atoms, a phenyl group, a benzyl group, an aminoethyl group, a hydroxyethyl group, or a hydroxypropyl group and $R^3$ is a hydroxyethyl group or a hydroxypropyl group); a salt (component B') of a dicarboxylic acid (component B) represented by a general formula (II): HOOC—$R^4$—COOH (II) (in the general formula (II), $R^4$ is an alkylene group having 10 or more and 12 or less carbon atoms) and the amine (component A); a salt (component C') of a monocarboxylic acid (component C) represented by a general formula (III): $R^5$—COOH (III) (in the general formula (III), $R^5$ is a linear or branched alkyl group or alkenyl group having 11 or more and 21 or less carbon atoms) and the amine (component A); a nonionic surfactant (component D) represented by a general formula (IV): $R^6$—O-{(EO)n/(PO)m}-H (IV) (in the general formula (IV), $R^6$ is a secondary alkyl group having 8 or more and 18 or less carbon atoms, EO is an ethyleneoxy group, PO is a propyleneoxy group, n is an average number of moles of EO added, m is an average number of moles of PO added, n is a number 2 or more and 20 or less, m is a number 0 or more and 20 or less, and forms of PO and EO added in curly brackets may be either random arrangement or block arrangement); and water (component E), and has a pH of more than 7 and 10 or less.

<Amine (Component A)>

The amine (component A) of the present invention is represented by the following general formula (I). The amine (component A) may be used singly or two or more thereof may be used concurrently.

[Formula 3]

(I)

(In the general formula (I), $R^1$ and $R^2$ are each independently a hydrogen atom, an alkyl group having 1 or more and 6 or less carbon atoms, a phenyl group, a benzyl group, an aminoethyl group, a hydroxyethyl group, or a hydroxypropyl group and $R^3$ is a hydroxyethyl group or a hydroxypropyl group.)

Examples of the amine (component A) include alkanolamines such as monoethanolamine, diethanolamine, and triethanolamine, and alkylated products and aminoalkylated products thereof. As the amine (component A), at least one selected from monoethanolamine, monoisopropanolamine, N-methylmonoethanolamine, N-methylmonoisopropanolamine, N-ethylmonoethanolamine, N-ethylmonoisopropanolamine, N-phenylmonoethanolamine, N-phenylmonoisopropanolamine, N-benzylmonoethanolamine, N-benzylmonoisopropanolamine, diethanolamine, diisopropanolamine, N-dimethylmonoethanolamine, N-dimethylmonoisopropanolamine, N-methyldiethanolamine, N-methyldiisopropanolamine, N-diethylmonoethanolamine, N-diethylmonoisopropanolamine, N-ethyldiethanolamine, N-ethyldiisopropanolamine, N-phenyldiethanolamine, N-phenyldiisopropanolamine, N-benzyldiethanolamine, N-benzyldiisopropanolamine, triethanolamine, N-(β-aminoethyl)monoethanolamine, N-(β-aminoethyl)monoisopropanolamine, N-(β-aminoethyl)diethanolamine, or N-(β-aminoethyl)diisopropanolamine is preferable, at least one selected from monoethanolamine, monoisopropanolamine, diethanolamine, N-methylmonoethanolamine, N-dimethylmonoethanolamine, N-ethylmonoethanolamine, triethanolamine, or N-(β-aminoethyl)monoethanolamine is more preferable, and at least one selected from diethanolamine or triethanolamine is still more preferable from the viewpoint of improving the detergency and the performance of suppressing corrosion of iron and non-ferrous metals such as aluminum.

<Dicarboxylic Acid (Component B)>

The dicarboxylic acid (component B) of the present invention is represented by the following general formula (II). The dicarboxylic acid (component B) may be used singly or two or more thereof may be used concurrently.

a salt (component B') of a dicarboxylic acid (component B) represented by a general formula (II): HOOC—$R^4$—COOH (II)

(In the general formula (II), $R^4$ is an alkylene group having 10 or more and 12 or less carbon atoms.)

Examples of the dicarboxylic acid (component B) include 1,10-decanedicarboxylic acid, 1,11-undecanedicarboxylic acid, and 1,12-dodecanedicarboxylic acid. The dicarboxylic acid (component B) is preferably 1,10-decanedicarboxylic acid from the viewpoint of improving the performance of suppressing corrosion of iron.

<Salt (Component B') of Dicarboxylic Acid (Component B) and Amine (Component A)>

The dicarboxylic acid (component B) and the amine (component A) form a salt in water, and thus the detergent composition for metal product of the present invention substantially contains a salt (component B') of the dicarboxylic acid (component B) and the amine (component A). The salt (component B') of the dicarboxylic acid (component B) and the amine (component A) may be used singly or two or more thereof may be used concurrently. As the salt (component B') of the dicarboxylic acid (component B) and the amine (component A), a raw material in which a salt has been formed in advance may be used to prepare the detergent composition for metal product of the present invention.

Examples of the salt (component B') of the dicarboxylic acid (component B) and the amine (component A) include 1,10-decanedicarboxylic acid diethanolamine salt, 1,11-undecanedicarboxylic acid diethanolamine salt, 1,12-dodecanedicarboxylic acid diethanolamine salt, 1,10-decanedicarboxylic acid triethanolamine salt, 1,11-undecanedicarboxylic acid triethanolamine salt, and 1,12-dodecanedicarboxylic acid triethanolamine salt. The salt (component B') of the dicarboxylic acid (component B) and the amine (component A) is preferably 1,10-decandicarboxylic acid diethanolamine salt and 1,10-decandicarboxylic acid triethanolamine salt from the viewpoint of improving the detergency and the performance of suppressing corrosion of iron.

<Monocarboxylic Acid (Component C)>

The monocarboxylic acid (component C) of the present invention is represented by the following general formula (III). The monocarboxylic acid (component C) may be used singly or two or more thereof may be used concurrently.

a salt (component C') of a monocarboxylic acid (component C) represented by a general formula (III): $R^5$—COOH (III)

(In the general formula (III), $R^5$ is a linear or branched alkyl group or alkenyl group having 11 or more and 21 or less carbon atoms.)

In the general formula (III), $R^5$ is preferably linear and preferably an alkenyl group from the viewpoint of improving the performance of suppressing corrosion of iron and non-ferrous metals such as aluminum. From the same viewpoint, $R^5$ has preferably 13 or more carbon atoms, more preferably 15 or more carbon atoms and preferably 19 or less carbon atoms, more preferably 17 or less carbon atoms.

Examples of the monocarboxylic acid (component C) include saturated fatty acids such as lauric acid, myristic acid, palmitic acid, stearic acid, arachidic acid, and behenic acid; and unsaturated fatty acids such as palmitoleic acid, oleic acid, elaidic acid, setoleic acid, erucic acid, brassidic acid, linoleic acid, linolenic acid, arachidonic acid, and stearolic acid. The monocarboxylic acid (component C) is preferably palmitic acid, stearic acid, oleic acid, or linoleic acid and more preferably oleic acid from the viewpoint of improving the performance of suppressing corrosion of iron and non-ferrous metals such as aluminum.

<Salt (Component C') of Monocarboxylic Acid (Component C) and Amine (Component A)>

The monocarboxylic acid (component C) and amine (component A) form a salt in water, and thus the detergent composition for metal product of the present invention substantially contains a salt (component C') of the monocarboxylic acid (component C) and the amine (component A). The salt (component C') of the monocarboxylic acid (component C) and the amine (component A) may be used singly or two or more thereof may be used concurrently. As the salt (component C') of the monocarboxylic acid (component C) and the amine (component A), a raw material in which a salt has been formed in advance may be used to prepare the detergent composition for metal product of the present invention.

Examples of the salt (component C') of the monocarboxylic acid (component C) and the amine (component A) include myristic acid diethanolamine salt, stearic acid diethanolamine salt, oleic acid diethanolamine salt, linoleic acid diethanolamine salt, myristic acid triethanolamine salt, stearic acid triethanolamine salt, oleic acid triethanolamine salt, and linoleic acid triethanolamine salt. The salt (component C') of the monocarboxylic acid (component C) and the amine (component A) is preferably myristic acid diethanolamine salt, oleic acid diethanolamine salt, myristic acid triethanolamine salt, and oleic acid triethanolamine salt and more preferably oleic acid diethanolamine salt and oleic acid triethanolamine salt from the viewpoint of improving the detergency and the performance of suppressing corrosion of iron and non-ferrous metals such as aluminum.

<Nonionic Surfactant (Component D)>

The nonionic surfactant (component D) of the present invention is a secondary alcohol ethoxylate compound represented by the following general formula (IV). The nonionic surfactant (component D) may be used singly or two or more thereof may be used concurrently.

a nonionic surfactant (component D) represented by a general formula (IV): $R^6$—O-{(EO)n/(PO)m}-H (IV)

(In the general formula (IV), $R^6$ is a secondary alkyl group having 8 or more and 18 or less carbon atoms, EO is an ethyleneoxy group, PO is a propyleneoxy group, n is an average number of moles of EO added, m is an average number of moles of PO added, n is a number 2 or more and 20 or less, m is a number 0 or more and 20 or less, and forms of PO and EO added in curly brackets may be either random arrangement or block arrangement.)

In the general formula (IV), $R^6$ is a secondary alkyl group having 8 or more and 18 or less carbon atoms. Here, the secondary alkyl group is a residue obtained by removing a hydroxyl group from a secondary alcohol and means that a carbon atom of $R^6$ bonded to 0 is a secondary carbon atom in $R^6$—O— in the general formula (IV).

In the general formula (IV), $R^6$ has preferably 10 or more carbon atoms, more preferably 12 or more carbon atoms and preferably 16 or less carbon atoms, more preferably 14 or less carbon atoms from the viewpoint of improving the detergency and the performance of suppressing corrosion of iron and non-ferrous metals such as aluminum.

In the general formula (IV), the ethyleneoxy group and the propyleneoxy group have distribution depending on the number of added moles, but the average number of moles of ethyleneoxy groups added n is preferably 3 or more, more preferably 4 or more, still more preferably 5 or more and preferably 15 or less, more preferably 10 or less, still more preferably 8 or less from the viewpoint of improving the detergency and the performance of suppressing corrosion of iron and non-ferrous metals such as aluminum. From the same viewpoint, the average number of moles of propyleneoxy groups added m is preferably 1 or more, more preferably 3 or more and preferably 10 or less, more preferably 5 or less. From the viewpoint of improving the detergency, the average number of moles of ethyleneoxy groups added n is preferably larger than the average number of moles of propyleneoxy groups added m.

<Water (Component E)>

As the water (component E) of the present invention, industrial water, tap water, deionized water, and the like can be used. Industrial water is preferable from the viewpoint of supply property and cost and ion-exchanged water is preferable from the viewpoint of detergency.

The detergent composition for metal product of the present invention has a pH of more than 7 and 10 or less. The pH is preferably 7.1 or more, more preferably 7.5 or more from the viewpoint of improving the detergency and the performance of suppressing corrosion of iron and non-ferrous metals such as aluminum. The pH is preferably 9.5 or less, more preferably 9.0 or less from the viewpoint of improving the performance of suppressing corrosion of non-ferrous metals such as aluminum.

In an embodiment of the present invention, it is preferable that the component A is diethanolamine and/or triethanolamine, the component B' is 1,10-decanedicarboxylic acid diethanolamine salt and/or 1,10-decanedicarboxylic acid triethanolamine salt, the component C' is oleic acid diethanolamine salt and/or oleic acid triethanolamine salt, and the component D is a nonionic surfactant represented by the general formula (IV).

It is more preferable that the component A is triethanolamine, the component B' is 1,10-decanedicarboxylic acid triethanolamine salt, the component C' is oleic acid triethanolamine salt, and the component D is a nonionic surfactant represented by the general formula (IV).

<Other Components>

The detergent composition for metal product of the present invention may contain components which are generally used as a detergent other than the components A to E in a range in which the performance is not affected. Examples of the components include a solubilizer, a dispersant, a thickening agent such as a thickener, a defoaming agent, a preservative, and a coloring agent.

<Defoaming Agent>

The detergent composition for metal product of the present invention preferably contains a defoaming agent from the viewpoint of suppressing the workability deterioration due to foaming and the cleaning liquid leaving loss. The defoaming agent is not particularly limited, and any defoaming agent can be used as long as it has a defoaming effect. Examples of the defoaming agent include a silicone-based defoaming agent and organic defoaming agents such as a polyether and a higher alcohol. It is desirable to use the defoaming agent in a small added amount in consideration of the influence on the cleaning performance, and a silicone-based defoaming agent is preferable. As the silicone-based defoaming agent, there are, for example, an oil type, an oil compound type, a solution type, an emulsion type, and a self-emulsifying type, and a self-emulsifying type is preferable from the viewpoint of improving the foam suppressing effect and of the storage stability of the detergent composition.

Hereinafter, the contents of the respective components contained in the detergent composition for metal product of the present invention will be described.

The content of the amine (component A) is preferably 0.01% by mass or more, more preferably 0.05% by mass or more, still more preferably 0.1% by mass or more in the detergent composition for metal product from the viewpoint of improving the detergency and is preferably 1.0% by mass or less, more preferably 0.7% by mass or less, still more preferably 0.5% by mass or less from the viewpoint of improving the detergency and decreasing the wastewater treatment load.

The content of the salt (component B') of the dicarboxylic acid (component B) and the amine (component A) is preferably 0.01% by mass or more, more preferably 0.05% by mass or more, still more preferably 0.1% by mass or more in the detergent composition for metal product from the viewpoint of improving the performance of suppressing corrosion of iron and is preferably 1.2% by mass or less, more preferably 0.7% by mass or less, still more preferably 0.5% by mass or less from the viewpoint of improving the detergency and decreasing the wastewater treatment load.

The content of the salt (component C') of the monocarboxylic acid (component C) and the amine (component A) is preferably 0.005% by mass or more, more preferably 0.05% by mass or more, still more preferably 0.1% by mass or more in the detergent composition for metal product from the viewpoint of improving the performance of suppressing corrosion of iron and non-ferrous metals such as aluminum and is preferably 0.5% by mass or less, more preferably 0.3% by mass or less, still more preferably 0.2% by mass or less from the viewpoint of improving the detergency and decreasing the wastewater treatment load.

The content of the nonionic surfactant (component D) is preferably 0.001% by mass or more, more preferably 0.005% by mass or more, still more preferably 0.01% by mass or more in the detergent composition for metal product from the viewpoint of improving the detergency and the performance of suppressing corrosion of iron and non-ferrous metals such as aluminum and is preferably 0.12% by mass or less, more preferably 0.1% by mass or less, still more preferably 0.05% by mass or less from the viewpoint of decreasing the wastewater treatment load.

The content of water (component E) is preferably 75% by mass or more, more preferably 90% by mass or more, still more preferably 98% by mass or more in the detergent composition for metal product from the viewpoint of improving the detergency and is preferably 99.97% by mass or less, more preferably 99.6% by mass or less, still more preferably 99.4% by mass or less from the same viewpoint.

The content of the other components is preferably 0% by mass or more and 5.0% by mass or less, more preferably 0% by mass or more and 2.0% by mass or less, still more preferably 0% by mass or more and 1.0% by mass or less, yet still more preferably 0% by mass or more and 0.5% by mass or less in the detergent composition for metal product in a range in which the performance is not affected.

The mass ratio (component B'/component C') of the salt (component B') of the dicarboxylic acid (component B) and the amine (component A) to the salt (component C') of the monocarboxylic acid (component C) and the amine (component A) is preferably 0.01 or more and 100 or less. The mass ratio (component B'/component C') of the salt (component B') of the dicarboxylic acid (component B) and the amine (component A) to the salt (component C') of the monocarboxylic acid (component C) and the amine (component A) is preferably 0.01 or more, more preferably 0.1 or more, still more preferably 1 or more from the viewpoint of improving the performance of suppressing corrosion of iron and is preferably 100 or less, more preferably 10 or less, still more preferably 5 or less from the viewpoint of improving the performance of suppressing corrosion of non-ferrous metals such as aluminum.

<Method for Producing Detergent Composition for Metal Product>

The detergent composition for metal product of the present invention can be produced by blending the respective components described above by a known method. The "blending" includes mixing the respective components described above at the same time or in an arbitrary order.

<Concentrate of Detergent Composition for Metal Product>

The detergent composition for metal product of the present invention may be prepared as a concentrate in which the amount of water of the component E is decreased in a range in which the storage stability is not impaired by the occurrence of separation, precipitation, and the like. The concentrate of the detergent composition is preferably prepared as a concentrate having a dilution degree of 3 times or more from the viewpoint of transportation and storage and is preferably prepared as a concentrate having a dilution degree of 30 times or less from the viewpoint of storage stability. The concentrate of the detergent composition can be used by being diluted with water so that the respective components have the above-mentioned contents at the time of use (namely, the contents at the time of cleaning). The concentrate of the detergent composition can also be used by separately adding the respective components at the time of use. In the present disclosure, "at the time of use" or "at the time of cleaning" of the detergent composition of the concentrate means a state in which the concentrate of the detergent composition has been diluted.

<Method for Cleaning Metal Product>

The method for cleaning a metal product of the present invention is a cleaning method which includes a step of cleaning a metal product using the detergent composition for metal product described above. In the method for cleaning a metal product, a so-called rinsing treatment in which the cleaned metal product is rinsed with water and the like can be provided after the cleaning step, but it is preferable not to perform the rinsing treatment after cleaning from the viewpoint of improving the performance of suppressing corrosion of iron and non-ferrous metals such as aluminum. Hence, the detergent composition for metal product of the present invention is suitable as a non-rinse type detergent composition for metal product.

Examples of an embodiment of the method for cleaning a metal product include a cleaning method including a series of steps of cleaning a metal product, removing excess detergent composition from the metal product by air purging and the like, and drying the metal product.

Here, as for the metal product, there are a number of cases where an appropriate metal material is selected and used for each portion of the metal product. In that case, a single metal part is manufactured for each portion and then a plurality of metal parts are assembled to manufacture a metal product. For example, steel containing iron as the main component is used to secure the strength and hardness if the metal product is a metal product that is used under a high load or is worried about wear due to sliding with other parts, an aluminum alloy containing aluminum as the main component is used to manufacture a weight-saved metal part if there is a demand to save the weight of metal part, and these are combined to construct a metal product. The metal product includes finished products completed by assembling all metal parts as well as sub-assy products that constitute a section of the finished product.

In cleaning of a metal product in which different metal materials are used for each portion in this way, there are harmful effects that it is required to select a detergent for each portion and to clean the metal product in separate cleaning steps, the cleaning is troublesome, and the step is lengthened when a detergent that is suitable for a metal material but is not suitable for another metal material is used. In this regard, the detergent composition for metal product of the present invention exhibits favorable detergency and anticorrosion property with respect to a plurality of metal materials as to be described later and is more preferably used for such metal products manufactured using a plurality of metal materials.

Examples of the method for cleaning a metal product include a cleaning method including an assembly step (step 1) of assembling a plurality of metal parts manufactured using different metal materials to assemble a metal product, a cleaning step (step 2) of spray-cleaning the metal product with a detergent composition, and a drying step (step 3) of performing drying while removing the excess detergent composition by air blow. According to this cleaning method, it is possible to perform rust prevention treatment while removing oils such as grease used when a plurality of metal parts are assembled and sebum adhering from human hands or various stains such as adhered dust, metal powder, and the like by a simple and short step.

Prior to the cleaning step, there may be a hydraulic oil filling step of filling the metal product with the hydraulic oil for operating the metal product. For example, the automatic transmission of a motor vehicle transmits the driving force from the engine to the transmission mechanism via hydraulic oil (ATF) in a torque converter and the transmission mechanism is also controlled by the hydraulic pressure of the hydraulic oil. Hence, it is indispensable to fill the automatic transmission as a metal product with the hydraulic oil. In a mass production facility, the hydraulic oil may adhere to the hydraulic oil inlet provided in the automatic transmission and the surroundings thereof in the hydraulic oil filling step. Such adhesion of hydraulic oil may be confused with oil leakage, and the removal of this hydraulic oil is important from the viewpoint of quality assurance. Hence, it is more preferable to perform the cleaning step after the hydraulic oil filling step.

The automatic transmission filled with hydraulic oil is attached to a predetermined inspection device, and a predetermined operation confirmation is inspected by applying the driving force from a motor that imitates the driving force of the engine. At this time, oil such as ATF, dust, and metal powder may adhere to the automatic transmission from the inspection device side. Hence, it is more preferable to perform the cleaning step after such an operation confirmation inspecting step.

It is needless to say that the detergent composition for metal product of the present invention may be used for a single metal part. Hence, for example, the detergent composition for metal product may be used for a single metal part among a plurality of metal parts constituting a metal product. Such metal parts are manufactured by various methods such as pressing, casting, cutting, and welding. At that time, lubricating oil and cutting oil are used or metal powder such as chips adheres, the presence of impurities in welding leads to welding defects, and thus cleaning of single metal parts is indispensable in the manufacturing process. Furthermore, there is a storage period until the single metal parts are assembled into a metal product after being manufactured or there is a part transportation period when the metal parts manufacturing factory is different from the metal product assembly factory, and there is thus a case where rust prevention treatment is performed after every cleaning or single metal parts are cleaned immediately before assembly and then assembled into a metal product. By using the detergent composition for metal product of the present invention in the step of cleaning a single metal part among a plurality of metal parts constituting a metal product, it is possible to effectively perform cleaning and prevent rust. By doing so, it is possible to clean a single metal part and a metal product obtained by assembling this single metal part and to prevent these from rusting by using the same detergent composition for metal product of the present invention. Hence, it is possible to unify the kinds of detergents used in the factory or to decrease the number of kinds and to facilitate the management of detergents.

The cleaning temperature of the metal product in the cleaning step is preferably 20° C. or more, more preferably 30° C. or more from the viewpoint of improving the detergency and is preferably 80° C. or less, more preferably 70° C. or less, still more preferably 60° C. or less from the viewpoint of suppressing corrosion of iron-based metals such as steel and non-ferrous metals such as aluminum and reducing energy cost.

The cleaning time in the cleaning step is preferably 1 second or more, more preferably 5 seconds or more from the viewpoint of improving the detergency and is preferably 100 seconds or less, more preferably 60 seconds or less from the viewpoint of improving the productivity.

Examples of the cleaning method in the cleaning step include continuous cleaning, namely, immersion cleaning, spray cleaning, brush cleaning, and ultrasonic cleaning. It is possible to clean and remove oil stains such as cutting oil and ATF oil adhered during the processing and storage period of single metal part and the assembly of metal product and solid stains such as dust and processing debris. The cleaning step is preferably immersion and spray cleaning, more preferably spray cleaning, and spray cleaning is suitably applied when a metal product passes through a cleaning tank by a belt conveyor or a roller conveyor.

In the spray cleaning, the spray pressure at the time of spray cleaning is preferably 0.1 MPa or more, more preferably 0.2 MPa or more and preferably 5 MPa or less, more preferably 1 MPa or less.

Examples of the metal product include the automatic transmission for motor vehicle as described above, but it is needless to say that the metal product is not limited thereto. When an iron-based metal and a non-ferrous metal appear on the outer surface, the iron-based metal and the non-ferrous metal can be cleaned and prevented from rusting by using the detergent composition for metal product of the present invention. Hence, examples of the metal product include machines, tools, jigs and tools which are used for processing of metal parts and assembly of metal products, and a transport device for transporting metal parts and metal products and jigs and tools thereof as well as sub-assy products before being assembled into metal products. For example, a jig which comes into contact with a metal product when the metal product is transported is cleaned and prevented from rusting in advance using the detergent composition for metal product of the present invention. By doing so, it is possible to prevent oil and the like from adhering to the metal product from the jig, to prevent rusting of the jig itself, and to decrease the replacement frequency. Hence, the cost of the entire step can be reduced. Examples of the metal include iron-based metals (steel, stainless steel, and the like) containing iron as a main component and non-ferrous metals (aluminum alloy, copper alloy, and the like) containing metals other than iron as a main component.

In addition to automatic transmissions, the detergent composition for metal product of the present invention can be used for metal parts and metal products, such as engines and motors, which constitute motor vehicles. It is clear that the detergent composition for metal product of the present invention can also be used in various industrial fields, and examples of the metal parts and metal products include metal products and metal parts which are used as raw materials for transportation machinery such as bicycles, railroads, ships, and airplanes, home appliances such as televisions, air conditioners, and refrigerators, electronic devices such as mobile terminals and computers, tableware, and beverage cans. Examples of the metal products include the parts themselves manufactured by subjecting metals to molding such as casting and plastic working, machining, turning, threading, cutting such as grinding, joining such as welding, brazing, soldering, heat treatment, and plating and products obtained by combining a plurality of parts.

EXAMPLES

Hereinafter, the present invention will be described in more detail by way of Examples, but the present invention is not limited to these Examples at all.

<Production (Preparation) of Detergent Composition for Metal Product>

Examples 1 to 13 and Comparative Examples 1 to 10

The detergent compositions of Examples 1 to 13 and Comparative Examples 1 to 10 were prepared by the following procedure so that each component presented in Table 1 or 2 had the content presented in Table 1 or Table 2. The numerical values presented in Table 1 or Table 2 represent the amounts of active ingredients, and the unit is % by mass.

1. Water (component E) was added into a vessel, an amine (component A) was added thereto, and the mixture was mixed and stirred to obtain a mixed solution.
2. A dicarboxylic acid (component B) and a monocarboxylic acid (component C) were added to the mixed solution obtained in 1 above, and the mixture was mixed and stirred to obtain a mixed solution.
3. When there were a nonionic surfactant (component D) and other components, the other components were added to the mixed solution obtained in 2 above, and the mixture was mixed and stirred to obtain a detergent composition for metal product. The pH was the pH of the detergent composition at 25° C., and the numerical value was measured in 3 minutes after the electrode of a pH meter (HM-30G manufactured by DKK-TOA CORPORATION) was immersed in the detergent composition.

<Raw Materials>

In Table 1 or Table 2,

Triethanolamine (TEA) denotes 2,2',2"-Nitrilotriethanol manufactured by Kishida Chemical Co., Ltd.;

Diethanolamine (DEA) denotes Diethanolamine manufactured by FUJIFILM Wako Pure Chemical Corporation;

1,10-Decanedicarboxylic acid TEA salt denotes a salt of 1,10-decanedicarboxylic acid (dodecanedioic acid manufactured by TOKYO CHEMICAL INDUSTRY CO., LTD.) and the above TEA;

Oleic acid TEA salt denotes a salt of oleic acid (manufactured by NACALAI TESQUE, INC.) and the above TEA;

Oleic acid DEA salt denotes a salt of oleic acid (manufactured by NACALAI TESQUE, INC.) and the above DEA;

Myristic acid TEA salt denotes a salt of myristic acid (LUNAC P-95 manufactured by Kao Corporation) and the above TEA;

D1 denotes polyethylene glycol (5) alkyl (secondary dodecyl and secondary tetradecyl mixed) ether ("SOFTANOL 50" manufactured by NIPPON SHOKUBAI CO., LTD.);

D2 denotes a nonionic surfactant D2 presented in Synthesis Example 1 to be described later;

Water denotes ion-exchanged water (pure water with 1 μS/cm or less produced using pure water machine G-10DSTSET manufactured by Organo Corporation);

Adipic acid TEA salt denotes a salt of adipic acid (manufactured by TOKYO CHEMICAL INDUSTRY CO., LTD.) and the above TEA;

1,9-Nonanedicarboxylic acid TEA salt denotes a salt of 1,9-nonanedicarboxylic acid (manufactured by TOKYO CHEMICAL INDUSTRY CO., LTD.) and the above TEA;

Capric acid TEA salt denotes a salt of capric acid (LUNAC 10-98 manufactured by Kao Corporation) and the above TEA;

Polyoxyethylene (5) lauryl ether denotes "EMULGEN 106" manufactured by Kao Corporation;

Sodium hydroxide denotes liquid caustic soda (concentration: 48% by mass) manufactured by Tokuyama Corporation;

Oleic acid Na salt denotes a salt of oleic acid (manufactured by NACALAI TESQUE, INC.) and the above sodium hydroxide; and Defoaming agent denotes "DOWSIL DK Q1-1183 ANTIFOAM" manufactured by Dow Corning Toray Co., Ltd.

Synthesis Example 1

Polyethylene glycol (7) alkyl (secondary dodecyl and secondary tetradecyl mixed) ether (1 mol, "SOFTANOL 70" manufactured by NIPPON SHOKUBAI CO., LTD.) and a catalytic amount of potassium hydroxide (manufactured by NACALAI TESQUE, INC.) were charged into the autoclave, nitrogen purging was performed, then dehydration was performed under reduced pressure to decrease the water content in the system to 0.2% or less, propylene oxide (4.5 mol) was added at 125° C. and 0.3 MPa or less, and aging was performed to obtain an EO-PO adduct (nonionic surfactant D2). The obtained nonionic surfactant D2 is represented by the general formula (IV) in which $R^6$ is a dodecyl group or a tetradecyl group, n is 7, and m is 4.5.

The detergent compositions for metal product obtained in Examples and Comparative Examples above were evaluated as follows. The evaluation results are presented in Tables 1 and 2.

<Evaluation on Detergency>

<Cleaning Test 1>

To an aluminum alloy plate (ADC12, 50 mm×20 mm×1.6 mm) which was a non-ferrous metal and was degrease-cleaned with acetone, 0.15 g of ATF oil was dropped, and the state was maintained for 1 hour. The aluminum alloy plate was spray-cleaned in a spray-cleaning machine using the detergent composition for metal product heated to 60° C. at a spray pressure of 0.5 MPa for 30 seconds, and dried by air blow after being cleaned. The residual oil on the aluminum alloy plate was extracted with 100 mL of OCMA exclusive oil extracting solvent (H-997 manufactured by HORIBA, Ltd.), and the residual oil (ppm) was measured using an oil concentration analyzer (OCMA-555 manufactured by HORIBA, Ltd.).

<Cleaning Test 2>

Into a 100 mL glass beaker, 100 g of detergent composition for metal product was charged and heated to 60° C., and a steel plate (SPCC, 50 mm×20 mm×0.8 mm) which was an iron-based metal and was degrease-cleaned with acetone was immersed in the detergent composition for metal product for 30 seconds. The steel plate was taken out and dried by air blow. The surface of the steel plate after being cleaned was visually observed and evaluated according to the following evaluation criteria.

1: No deposit

2: With deposits

<Water Resistance Test (Aluminum)>

Into a 100 mL glass beaker, 100 g of detergent composition for metal product was charged and heated to 60° C., and an aluminum alloy plate (ADC12, 50 mm×20 mm×1.6 mm) degrease-cleaned with acetone was immersed in the detergent composition for metal product for 30 seconds. The aluminum alloy plate was taken out and dried by air blow. Next, the aluminum alloy plate was immersed in 50 g of water heated to 60° C. for 1 hour, the amount of aluminum ions eluted into water after immersion was measured using an ICP emission spectrophotometer (Agilent 5110 ICP-OES manufactured by Agilent Technologies, Inc.), and the amount of aluminum eluted ($g/m^2$) per unit area was calculated from the measurement results and the surface area of the aluminum alloy plate. The surface of the aluminum alloy plate after being tested was visually observed and evaluated according to the following evaluation criteria.

1: Not corroded

2: Corroded

<Water Resistance Test (Iron)>

Into a 100 mL glass beaker, 100 g of detergent composition for metal product was charged and heated to 60° C., and a steel plate (SPCC, 50 mm×20 mm×0.8 mm) degrease-cleaned with acetone was immersed in the detergent composition for metal product for 30 seconds. The steel plate was taken out and dried by air blow. Next, the steel plate was immersed in 50 g of water heated to 60° C. for 1 hour, the amount of iron ions eluted into water after immersion was measured using an ICP emission spectrophotometer (Agilent 5110 ICP-OES manufactured by Agilent Technologies, Inc.), and the amount of iron eluted ($g/m^2$) per unit area was calculated from the measurement results and the surface area of the steel plate. The surface of the steel plate after being tested was visually observed and evaluated according to the following evaluation criteria.

1: Not rusted

2: Rusted

<Solubility (Aluminum)>

Into a petri dish (made of polystyrene), 20 g of detergent composition for metal product was charged and heated to 60° C., and an aluminum alloy plate (ADC12, 50 mm×20 mm×1.6 mm) degrease-cleaned with acetone was immersed in the detergent composition for metal product for 1 hour. The aluminum alloy plate was taken out, the amount of aluminum ions eluted into the detergent composition for metal product was measured using an ICP emission spectrophotometer (Agilent 5110 ICP-OES manufactured by Agilent Technologies, Inc.), and the amount of aluminum eluted ($g/m^2$) per unit area was calculated from the measurement results and the surface area of the aluminum alloy plate.

<Solubility (Iron)>

Into a petri dish (made of polystyrene), 20 g of detergent composition for metal product was charged and heated to 60° C., and a steel plate (SPCC, 50 mm×20 mm×0.8 mm) degrease-cleaned with acetone was immersed in the detergent composition for metal product for 1 hour. Next, the steel plate was taken out, the amount of iron ions eluted into the detergent composition for metal product was measured using an ICP emission spectrophotometer (Agilent 5110 ICP-OES manufactured by Agilent Technologies, Inc.), and the amount of iron eluted ($g/m^2$) per unit area was calculated from the measurement results and the surface area of the steel plate.

TABLE 1

| Detergent composition for metal product | | Example 1 | 2 | 3 | 4 | 5 | 6 | 7 |
|---|---|---|---|---|---|---|---|---|
| Component A | Triethanolamine (TEA) | 0.270 | | 0.270 | 0.270 | 0.203 | 0.405 | 0.270 |
| | Diethanolamine (DEA) | | 0.157 | | | | | |
| Component B' | 1,10-Decanedicarboxylic acid TEA salt | 0.310 | | 0.310 | 0.310 | 0.310 | 0.310 | 0.155 |
| | 1,10-Decanedicarboxylic acid DEA salt | | 0.258 | | | | | |
| Component C' | Oleic acid TEA salt | 0.144 | | 0.138 | 0.144 | 0.144 | 0.144 | 0.144 |
| | Oleic acid DEA salt | | 0.130 | | | | | |
| | Myristic acid TEA salt | | | 0.007 | | | | |
| Component D | D1 | | | | 0.032 | | | |
| | D2 | 0.032 | 0.032 | 0.032 | | 0.032 | 0.032 | 0.032 |
| Component E | Water | 99.244 | 99.424 | 99.244 | 99.244 | 99.311 | 99.109 | 99.399 |
| Other components | Defoaming agent | | | | | | | |
| | pH (25° C.) | 8.10 | 8.80 | 8.09 | 8.10 | 8.01 | 8.28 | 8.37 |
| | Component B'/Component C' | 2.15 | 1.99 | 2.14 | 2.15 | 2.15 | 2.15 | 1.07 |
| Cleaning test 1 | Residual oil (ppm) | 53 | 80 | 62 | 73 | 78 | 38 | 62 |
| Cleaning test 2 | Steel plate surface condition | 1 | 1 | 1 | 1 | 1 | 1 | 1 |
| Water resistance test | Aluminum alloy plate surface condition | 1 | 1 | 1 | 1 | 1 | 1 | 1 |
| | Amount of aluminum eluted ($g/m^2$) | 0.00 | 0.10 | 0.04 | 0.02 | 0.01 | 0.05 | 0.01 |
| | Steel plate surface condition | 1 | 1 | 1 | 1 | 1 | 1 | 1 |
| | Amount of iron eluted ($g/m^2$) | 3.93 | 3.70 | 4.18 | 2.49 | 2.78 | 1.85 | 1.35 |

TABLE 1-continued

| | | | | | | | | |
|---|---|---|---|---|---|---|---|---|
| Solubility | Amount of aluminum eluted (g/m$^2$) | 0.02 | 0.09 | 0.03 | 0.02 | 0.01 | 0.04 | 0.03 |
| | Amount of iron eluted (g/m$^2$) | 0.39 | 0.60 | 0.30 | 0.42 | 0.62 | 0.63 | 0.37 |

| Detergent composition for metal product | | Example 8 | 9 | 10 | 11 | 12 | 13 |
|---|---|---|---|---|---|---|---|
| Component A | Triethanolamine (TEA) | 0.270 | 0.270 | 0.270 | 0.270 | 0.270 | 0.270 |
| | Diethanolamine (DEA) | | | | | | |
| Component B' | 1,10-Decanedicarboxylic acid TEA salt | 0.455 | 0.310 | 0.310 | 0.310 | 0.310 | 0.310 |
| Component C' | 1,10-Decanedicarboxylic acid DEA salt | 0.144 | 0.110 | 0.206 | 0.144 | 0.144 | 0.144 |
| | Oleic acid TEA salt | | | | | | 0.032 |
| | Oleic acid DEA salt | 0.032 | 0.032 | 0.032 | 0.016 | 0.045 | |
| | Myristic acid TEA salt | 99.100 | 99.279 | 99.182 | 99.260 | 99.231 | 99.019 |
| Component D | D1 | | | | | | |
| | D2 | | | | | | |
| Component E | Water | | | | | | |
| Other components | Defoaming agent | | | | | | 0.225 |
| | pH (25° C.) | 7.93 | 8.09 | 8.12 | 8.08 | 8.07 | 8.08 |
| | Component B'/Component C' | 3.15 | 2.82 | 1.50 | 2.15 | 2.15 | 2.15 |
| Cleaning test 1 | Residual oil (ppm) | 69 | 41 | 69 | 82 | 41 | 32 |
| Cleaning test 2 | Steel plate surface condition | 1 | 1 | 1 | 1 | 1 | 1 |
| Water resistance test | Aluminum alloy plate surface condition | 1 | 1 | 1 | 1 | 1 | 1 |
| | Amount of aluminum eluted (g/m$^2$) | 0.04 | 0.46 | 0.02 | 0.05 | 0.04 | 0.07 |
| | Steel plate surface condition | 1 | 1 | 1 | 1 | 1 | 1 |
| | Amount of iron eluted (g/m$^2$) | 3.64 | 4.41 | 3.55 | 2.95 | 4.62 | 3.60 |
| Solubility | Amount of aluminum eluted (g/m$^2$) | 0.02 | 0.03 | 0.02 | 0.02 | 0.03 | 0.02 |
| | Amount of iron eluted (g/m$^2$) | 0.47 | 0.40 | 0.43 | 0.39 | 0.40 | 0.41 |

TABLE 2

| Detergent composition for metal product | | Comparative Example 1 | 2 | 3 | 4 | 5 | 6 | 7 | 8 | 9 | 10 |
|---|---|---|---|---|---|---|---|---|---|---|---|
| Component A | Triethanolamine (TEA) | | 0.270 | 0.270 | 0.270 | 0.270 | 0.270 | 0.301 | 0.270 | | 0.270 |
| | Diethanolamine (DEA) | | | | | | | | | | |
| Component B' | 1,10-Decanedicarboxylic acid TEA salt | 0.310 | | 0.310 | 0.310 | | | 0.310 | 0.310 | | 0.310 |
| | 1,10-Decanedicarboxylic acid DEA salt | | | | | | | | | | |
| Component C' | Oleic acid TEA salt | 0.144 | 0.144 | | 0.144 | 0.144 | 0.144 | | 0.144 | | 0.144 |
| | Oleic acid DEA salt | | | | | | | | | | |
| | Myristic acid TEA salt | | | | | | | | | | |
| Component D | D1 | | | | | | | | | | |
| | D2 | 0.032 | 0.032 | 0.032 | | 0.032 | 0.032 | 0.032 | | 0.032 | 0.032 |
| Component E | Water | 99.514 | 99.554 | 99.388 | 99.276 | 99.239 | 99.233 | 99.257 | 99.244 | 99.504 | 99.199 |
| Other components | Adipic acid TEA salt (not component B) | | | | | 0.315 | | | | | |
| | 1,9-Nonanedicarboxylic acid TEA salt (not component B) | | | | | | 0.321 | | | | |
| | Capric acid TEA salt (not component C) | | | | | | | 0.101 | | | |
| | Polyoxyethylene (5) lauryl ether (not component D) | | | | | | | | 0.032 | | |
| | Sodium hydroxide (not component A) | | | | | | | | | 0.0004 | 0.045 |
| | 1,10-Decandicarboxylic acid Na salt (not component B) | | | | | | | | | 0.322 | |
| | Oleic acid Na salt (not component C) | | | | | | | | | 0.142 | |
| | Defoaming agent | | | | | | | | | | |
| | pH (25° C.) | 7.06 | 8.95 | 8.08 | 8.09 | 8.02 | 8.01 | 8.02 | 8.10 | 8.94 | 12.44 |
| | Component B'/Component C' | 2.15 | 0.00 | — | 2.15 | 0.00 | 0.00 | — | 2.15 | — | 2.15 |
| Cleaning test 1 | Residual oil (ppm) | 87 | 65 | 92 | 189 | 51 | 53 | 78 | 78 | 28 | 23 |
| Cleaning test 2 | Steel plate surface condition | 1 | 1 | 1 | 1 | 1 | 1 | 1 | 1 | 2 | 2 |

TABLE 2-continued

| | | Comparative Example | | | | | | | | | |
|---|---|---|---|---|---|---|---|---|---|---|---|
| Detergent composition for metal product | | 1 | 2 | 3 | 4 | 5 | 6 | 7 | 8 | 9 | 10 |
| Water resistance test | Aluminum alloy plate surface condition | 2 | 1 | 2 | 2 | 1 | 1 | 1 | 2 | 2 | 1 |
| | Amount of aluminum eluted (g/$m^2$) | 1.03 | 0.06 | 1.05 | 5.43 | 0.07 | 0.00 | 0.04 | 1.77 | 0.89 | 0.09 |
| | Steel plate surface condition | 1 | 2 | 2 | 2 | 2 | 2 | 2 | 2 | 1 | 2 |
| | Amount of iron eluted (g/$m^2$) | 3.49 | 5.83 | 5.90 | 12.65 | 5.11 | 6.02 | 5.09 | 13.71 | 1.38 | 2.37 |
| Solubility | Amount of aluminum eluted (g/$m^2$) | 0.00 | 0.04 | 0.58 | 0.01 | 0.10 | 0.04 | 0.15 | 0.04 | 0.52 | 202.49 |
| | Amount of iron eluted (g/$m^2$) | 0.67 | 0.43 | 0.29 | 0.43 | 0.78 | 0.63 | 0.28 | 0.54 | 0.35 | 0.26 |

<Automatic Transmission for Motor Vehicle>

Here, the automatic transmission for motor vehicles used in the following Examples and Comparative Examples will be described with reference to FIG. 1. In the automatic transmission, a torque converter is housed inside a case A, and a transmission mechanism and a differential mechanism are housed inside a case B. An oil pan for storing hydraulic oil is attached to the case B, and the hydraulic oil is supplied from this oil pan to each portion in the automatic transmission. The oil pan is provided with a hydraulic oil supply port. Since the transmission mechanism of the automatic transmission is electrically controlled, a connector for connecting the wiring from the vehicle side is embedded by opening the case B. Since the torque converter is a portion that is mechanically fastened to the vehicle side, the case A has a large opening. A wall is provided between the case A and the case B, and a shaft member that transmits the driving force transmitted from the vehicle side to the transmission mechanism via the torque converter is provided through the wall. The space between the shaft member and the wall are sealed with a sealing member so that the hydraulic oil does not leak. If the torque converter is the input unit of the driving force from the vehicle side, the differential device is the output unit of the driving force to the vehicle side, and thus the case section that covers the differential device is also open to be connected to the vehicle side. Since the automatic transmission has such a configuration and the case A is open, the torque converter inside the automatic transmission is also cleaned at the same time.

(Incidentally, the opening of the case section that covers the differential device is equipped with a cap to prevent oil leakage before the differential device is fastened to the vehicle side, and the differential device is not cleaned.)

As for the material of each member, the cases A and B are made of aluminum alloy, and the torque converter, transmission mechanism, differential device, and oil pan are made of steel. The connector cover is made of plastic resin, and the connector pins are made of copper plated with tin. The sealing member is rubber resin. Although not illustrated, the bolts that fasten the cases A and B are made of an iron-based alloy plated with zinc, and the lever member that is connected to the transmission mechanism and protrudes to the outside of the case B is made of an iron-based alloy plated with chrome.

Grease is applied to the sealing member so that the sealing member is equipped to the shaft member while being familiarized. Grease is also used for the cap sections of the openings of the cases A and B that cover the differential device.

In the test, the hydraulic oil was added in the automatic transmission and the inlet was capped before cleaning. The automatic transmission before being cleaned was subjected to the test in a state in which hydraulic oil adhered to the case surface and grease adhered so that excess grease came out of the automatic transmission.

Example 14 and Comparative Example 11

<Cleaning Test 3>

The automatic transmission for motor vehicle that had undergone the preliminary treatment described above was spray-cleaned at 60° C. in the existing cleaning facility (spray cleaning type) using the detergent composition for metal product prepared in Example 13, and then dried by air blow. On the other hand, as Comparative Example 11, a detergent composition containing 0.233% by mass of triethanolamine, 0.282% by mass of diethanolamine, 0.140% by mass of 1,10-decandicarboxylic acid TEA salt, 0.117% by mass of 1,10-decanedicarboxylic acid DEA salt, 0.146% by mass of caprylic acid TEA salt, 0.126% by mass of caprylic acid DEA salt, and water as the balance was used. In the case of using any of the detergent compositions for metal product, the automatic transmission after being dried was visually examined, and it was confirmed that cleaning residue of ATF was not confirmed and the excess grease was also removed. Abnormalities such as erosion and deformation were not observed in the connector and sealing member.

<Accelerated Aging Test>

After that, the automatic transmission was placed in a thermostatic chamber, the temperature and humidity of the air in the thermostatic chamber were controlled under the following conditions, and dew condensation and drying were repeated to perform an accelerated aging test.

[Test Conditions]

A cleaned and dried automatic transmission was placed in a thermostatic chamber and first held for 2 hours in an atmosphere having a temperature of 25° C. and a humidity of 70%. Subsequently, the atmosphere was changed over 2 hours so that the atmosphere had a temperature of 50° C. and a humidity of 95%. Next, the automatic transmission was held for 4 hours in the atmosphere having a temperature of 50° C. and a humidity of 95%, then the atmosphere was changed over 2 hours so that the atmosphere had a temperature of 25° C. and a humidity of 70%, and then the automatic transmission was held for 2 hours in the atmosphere having a temperature of 25° C. and a humidity of 70%. This was set as one cycle, and this cycle was repeated.

As a result, the aluminum alloy case section was rusted at the end of the first cycle in the automatic transmission cleaned with the detergent of Comparative Example 11, but the aluminum alloy case section was not rusted until the end of the third cycle in the automatic transmission that was cleaned and prevented from rusting with the detergent composition for metal product of Example 13.

The steel torque converter section was rusted in the first cycle in the same manner as the case section in the automatic transmission cleaned with the detergent of Comparative Example 11, but the steel torque converter section was not rusted until the end of the fifth cycle in the automatic transmission that was cleaned and prevented from rusting with the detergent composition for metal product of Example 13. Abnormalities such as discoloration, deformation, cracking, and hardening were not observed in the connector cover and sealing member even after the end of the sixth cycle in the automatic transmission that was cleaned and prevented from rusting with the detergent composition for metal product of Example 13, and it was found that the detergent composition for metal product can be simultaneously used for resin members. Abnormalities such as corrosion and discoloration did not occur in the connector pins, bolts, and lever members as well, and it was found that the detergent composition for metal product can be used for members subjected to various plating treatments as well.

The invention claimed is:

1. A detergent composition for metal product, prepared by blending at least an amine, a carboxylic acid, a nonionic surfactant (component D), and water (component E), the amine comprises an amine (component A) represented by general formula (I):

[Formula 1]

(I)

in the general formula (I), $R^1$ and $R^2$ are each independently a hydrogen atom, an alkyl group having 1 or more and 6 or less carbon atoms, a phenyl group, a benzyl group, an aminoethyl group, a hydroxyethyl group, or a hydroxypropyl group and $R^3$ is a hydroxyethyl group or a hydroxypropyl group;

the carboxylic acid consists of a dicarboxylic acid (component B) represented by general formula (II):

$$HOOC—R^4—COOH \quad (II)$$

in the general formula (II), $R^4$ is an alkylene group having 10 or more and 12 or less carbon atoms, and a monocarboxylic acid (component C) represented by the general formula (III):

$$R^5—COOH \quad (III)$$

in the general formula (III), $R^5$ is a linear or branched alkyl group or alkenyl group having 13 or more and 21 or less carbon atoms;

the nonionic surfactant (component D) is a nonionic surfactant represented by general formula (IV):

$$R^6—O\text{-}\{(EO)n/(PO)m\}\text{-}H \quad (IV)$$

in the general formula (IV), $R^6$ is a secondary alkyl group having 12 or more and 18 or less carbon atoms, EO is an ethyleneoxy group, PO is a propyleneoxy group, n is an average number of moles of EO added, m is an average number of moles of PO added, n is a number 2 or more and 20 or less, m is a number 0 or more and 20 or less, and forms of PO and EO added in curly brackets may be either random arrangement or block arrangement; wherein a pH of the detergent composition for metal product is more than 7 and 10 or less.

2. The detergent composition for metal product according to claim 1, wherein a content of the amine (component A) represented by formula (I) is 0.01% by mass or more and 1.0% by mass or less, a content of a component B' which is a salt of the dicarboxylic acid (component B) represented by formula (II) and the amine (component A) is 0.01% by mass or more and 1.2% by mass or less, a content of a component C' which is a salt of the monocarboxylic acid (component C) represented by the general formula (III) and the amine (component A) is 0.005% by mass or more and 0.5% by mass or less, and a content of the component D is 0.001% by mass or more and 0.12% by mass or less.

3. The detergent composition for metal product according to claim 1, wherein a content of the component E is 75% by mass or more and 99.97% by mass or less.

4. The detergent composition for metal product according to claim 1, wherein a mass ratio (component B'/component C') of the salt (component B') of the dicarboxylic acid (component B) and the amine (component A) to the salt (component C') of the monocarboxylic acid (component C) and the amine (component A) is 0.01 or more and 100 or less.

5. The detergent composition for metal product according to claim 1, wherein the salt (component B') of the dicarboxylic acid (component B) and the amine (component A) is selected from 1,10-decanedicarboxylic acid diethanolamine salt, 1,11-undecanedicarboxylic acid diethanolamine salt, 1,12-dodecanedicarboxylic acid diethanolamine salt, 1,10-decanedicarboxylic acid triethanolamine salt, 1,11-undecanedicarboxylic acid triethanolamine salt, 1,12-dodecanedicarboxylic acid triethanolamine salt, or mixtures thereof.

6. The detergent composition for metal product according to claim 1, wherein the salt (component C') of the monocarboxylic acid (component C) and the amine (component A) is selected from myristic acid diethanolamine salt, stearic acid diethanolamine salt, oleic acid diethanolamine salt, linoleic acid diethanolamine salt, myristic acid triethanolamine salt, stearic acid triethanolamine salt, oleic acid triethanolamine salt, linoleic acid triethanolamine salt, or mixtures thereof.

7. A method for cleaning a metal product, the method comprising a step of cleaning a by contacting the metal product with the detergent composition for metal product according to claim 1.

8. The method for cleaning a metal product according to claim 7, wherein a rinsing treatment is not performed after the cleaning step.

9. The method for cleaning a metal product according to claim 7, wherein a cleaning means in the cleaning step is spray cleaning.

10. The method for cleaning a metal product according to claim 7, wherein the metal product is an iron-based metal part obtained using an iron-based metal containing iron as a main component as a raw material or a non-ferrous metal part obtained using a non-ferrous metal alloy containing a non-ferrous metal as a main component as a raw material.

11. The method for cleaning a metal product according to claim 7, wherein the metal product comprises an iron-based metal part and a non-ferrous metal part and the iron-based metal part and the non-ferrous metal part are cleaned at the same time in the cleaning step.

12. The method for cleaning a metal product according to claim 11, which comprises:

an assembly step of assembling the iron-based metal part and the non-ferrous metal part which are separately manufactured to assemble a metal product;

a cleaning step of simultaneously cleaning the assembled metal product as a unit; and a drying step of performing drying while removing excess of the detergent composition for metal product by air blow.

13. The method for cleaning a metal product according to claim 12, wherein hydraulic oil for operating the metal product is added in an interior of the metal product and the method comprises a hydraulic oil filling step of adding the hydraulic oil before the cleaning step.

14. The method for cleaning a metal product according to claim 13, which comprises an inspection step of confirming operation of the metal product between the hydraulic oil filling step and the cleaning step.

15. The method for cleaning a metal product according to claim 14, wherein the metal product is an automatic transmission.

16. The method for cleaning a metal product according to claim 7, wherein the metal product is a jig for transporting another metal product.

* * * * *